US006839758B2

(12) United States Patent
Sørensen

(10) Patent No.: US 6,839,758 B2
(45) Date of Patent: Jan. 4, 2005

(54) NETWORK PROCESSOR FOR CACHE ARRAY ROUTING

(75) Inventor: Lauge S. Sørensen, Hillerød (DK)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 09/964,804

(22) Filed: Sep. 28, 2001

(65) Prior Publication Data

US 2003/0065885 A1 Apr. 3, 2003

(51) Int. Cl.[7] .............................................. G06F 12/00
(52) U.S. Cl. ........................ 709/226; 709/229; 709/239
(58) Field of Search ................................. 711/119, 122, 711/129, 130, 120, 147, 148, 132, 153; 709/224, 226, 235; 707/10

(56) References Cited

U.S. PATENT DOCUMENTS

| | | | | |
|---|---|---|---|---|
| 6,070,191 A | * | 5/2000 | Narendran et al. | 709/226 |
| 6,240,461 B1 | * | 5/2001 | Cieslak et al. | 709/235 |
| 6,370,620 B1 | * | 4/2002 | Wu et al. | 711/132 |
| 6,377,991 B1 | * | 4/2002 | Smith et al. | 709/226 |
| 6,389,462 B1 | * | 5/2002 | Cohen et al. | 709/218 |
| 6,438,652 B1 | * | 8/2002 | Jordan et al. | 711/120 |
| 6,481,621 B1 | * | 11/2002 | Herrendoerfer et al. | 235/380 |
| 6,532,493 B1 | * | 3/2003 | Aviani, Jr. et al. | 709/224 |
| 6,535,509 B2 | * | 3/2003 | Amicangioli | 370/389 |
| 6,542,964 B1 | * | 4/2003 | Scharber | 711/122 |
| 6,553,376 B1 | * | 4/2003 | Lewis et al. | 707/10 |
| 2002/0007413 A1 | * | 1/2002 | Garcia-Luna-Aceves et al. | 709/229 |
| 2002/0073232 A1 | * | 6/2002 | Hong et al. | 709/238 |

OTHER PUBLICATIONS

Cache array routing protocol v1.0, V. Valloppollil.*
Microsoft Corp., White Paper, posted at http://www.microsoft.com/ISASERVER/evaluation/previousversions/wp_carp.asp on Sep. 7, 2001 and entitled "Cache Array Routing Protocol and Proxy Server 2.0".

* cited by examiner

Primary Examiner—Nasser Moazzami
(74) Attorney, Agent, or Firm—Kenyon & Kenyon

(57) ABSTRACT

A transparent network processor receives a URL request from a client computer and determines a cache in a cache array that stores a URL corresponding to the URL request. The network processor then redirects the URL request to the determined cache.

18 Claims, 2 Drawing Sheets

NETWORK PROCESSOR FOR CACHE ARRAY ROUTING

FIELD OF THE INVENTION

The present invention is directed to data communication over a computer network. More particularly, the present invention is directed to data caching and retrieval over the Internet.

BACKGROUND INFORMATION

The Internet World Wide Web ("WWW") has become so popular, and the traffic so heavy, that frustration with response times has led to jokes about the WWW standing for the World Wide Wait. Proxy servers, which were originally developed for security as extensions of firewalls, have proved to have additional value in reducing Internet access delays by increasing the speed with which their cached uniform resource locators ("URLs") are returned to users.

Proxy servers, or "proxy caches", allow the most requested URLs to be stored in cache. As a result, the proxy servers provide the following advantages and efficiencies:

Less network traffic. Once an object has been downloaded from the Internet, subsequent users will retrieve that object from the cache instead of having to request the same object across a remote network link.

Better user performance. Typically proxy caches reside much closer to an end user than the remote web server. Additionally, while requests across the Internet are serviced at lowest common denominator WAN speeds (typically 64 kbps–1.5 Mbps), requests to the cache are serviced at LAN speeds (10 Mbps–100 Mbps).

Better perceived network reliability. Having cached copies of objects compensates for transient Internet "brownouts" and loss of service due to heavy congestion on remote segments.

Caching has proven to be so efficient that the need was soon seen for deploying multiple proxy servers that could communicate and work together to create a more robust system. In 1995 the Internet Cache Protocol ("ICP") was developed to allow individual proxies to "query" manually configured neighboring proxies in order to find cached copies of requested objects. If all queries failed to find a cached object, the proxy would then use HyperText Transfer Protocol ("HTTP") to request the object from the Internet.

Although ICP allows proxy servers to be networked together, certain problems emerge when using the protocol. These include:

ICP arrays must conduct queries to determine the location of cached information, an inefficient process that generates extraneous network traffic.

ICP arrays have "negative scalability" in that the more proxy servers added to the array, the more querying required between servers to determine location.

ICP arrays over a period of time tend to become highly redundant, with each server containing largely the same information—the URLs of the most frequently used sites.

DETAILED DESCRIPTION

Figure 1:
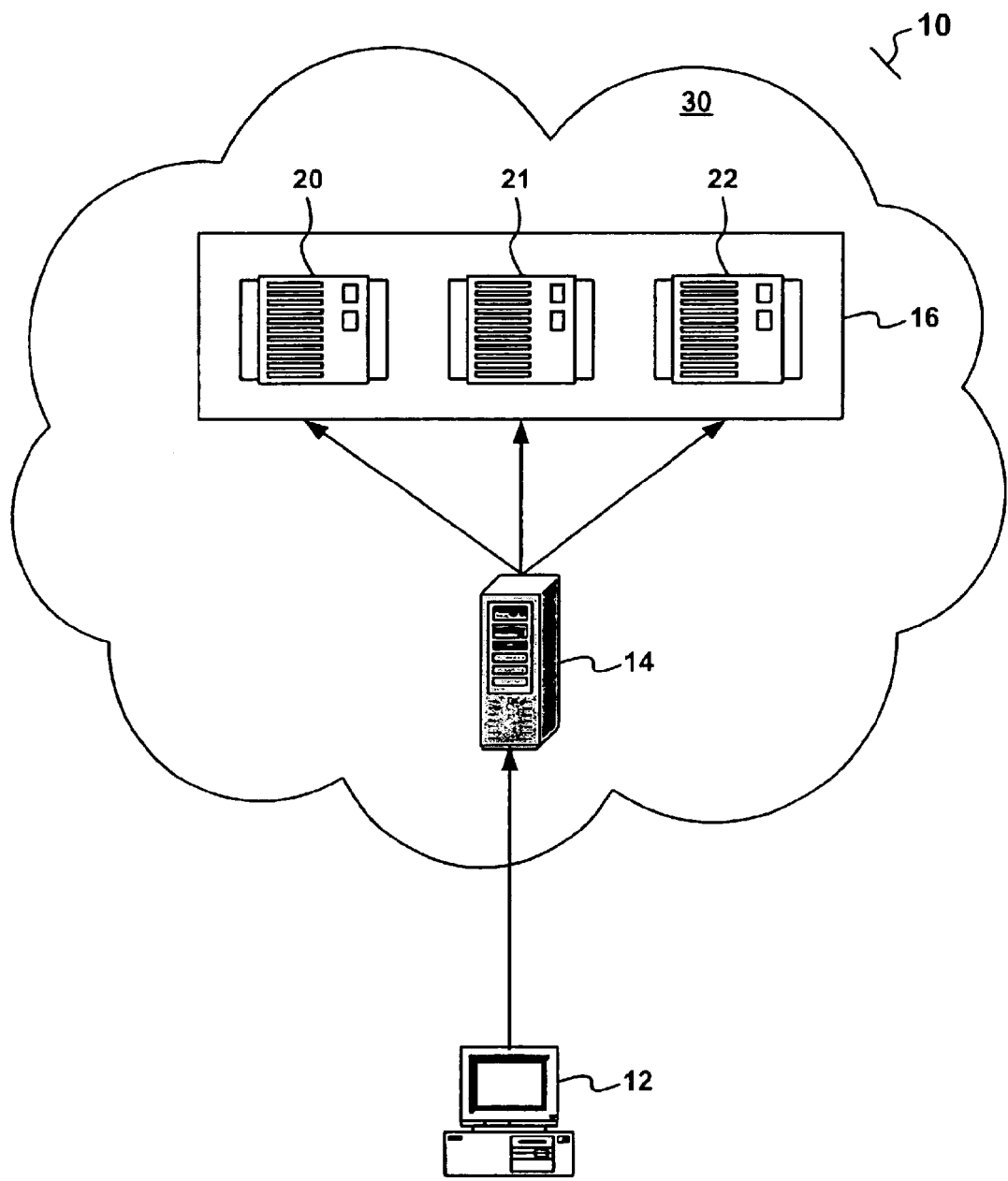
FIG. 1 is a block diagram of a communication system that includes one embodiment of the present invention.

One embodiment of the present invention is a network processor that directly routes Internet requests to the appropriate proxy cache in a cache array. This optimizes traffic in a caching environment by greatly reducing intercache traffic.

In order to avoid some of the above-described problems with ICP, Microsoft Corp. has recently introduced the Cache Array Routing Protocol ("CARP") specification. Details of the CARP specification are disclosed in, for example, a White Paper posted at http://www.microsoft.com/ISASERVER/evaluation/previousversions/wp_carp.asp on Sep. 7, 2001 and entitled "Cache Array Routing Protocol and Proxy Server 2.0".

CARP allows for queryless distributed caching by utilizing a series of algorithms that are applied on top of HTTP. CARP provides advantages over ICP for some of the following reasons:

CARP doesn't conduct queries. Instead it uses hash-based routing to provide a deterministic "request resolution path" through an array of proxies. The result is single-hop resolution. A web browser, such as the Internet Explorer from Microsoft Corp., or a downstream proxy cache, can determine exactly where each URL would be stored across the array of cache servers.

CARP has positive scalability. Due to its hash-based routing, and hence, its freedom from peer-to-peer pinging, CARP becomes faster and more efficient as more proxy servers are added.

CARP protects proxy server arrays from becoming redundant mirrors of content. This vastly improves the efficiency of the proxy array, allowing all servers to act as a single logical cache.

CARP automatically adjusts to additions or deletions of servers in the array. The hashed-based routing means that when a server is either taken off line or added, only minimal reassignment of URL cache locations is required.

CARP provides its efficiencies without requiring a new wire protocol. It simply uses the open standard HTTP. One advantage of this is compatibility with existing firewalls and proxy servers.

CARP can be implemented on clients using the existing, industry-standard client Proxy Auto-Config file ("PAC"). This extends the systemic benefits of single hop resolution to clients as well as proxies. By contrast, ICP is only implemented on Proxy servers.

Two routing options are disclosed in the CARP specification—hierarchical and distributed. Hierarchical routing involves forwarding requests from a single downstream proxy cache server up to an array of upstream proxies. The downstream proxy has n upstream proxies to which it can forward requests. The downstream proxy uses the array membership list of the upstream proxies and hash-based routing to intelligently determine which upstream proxy to forward the request to.

Distributed routing involves resolving requests received by one member of the array via another member of the same array. Distributed routing uses hash-based routing to intelligently process requests within an array of proxies. In this scenario, a proxy with full knowledge of the members of its own array determines that the request is not ideally processed by itself. The first proxy then forwards the request to the 'highest scoring' second proxy. Because the first proxy forwarded the request within its own array, it won't cache the returned response since a cacheable response will be held in the second proxy. This provides maximum efficiency in cache usage, protecting the efficiency of a single coordinated disk cache spread out across all machines.

In general, the CARP specification assumes that downstream members send request from one cache in a CARP array, which will then forward the requests to the appropriate cache holding the content (i.e., URL) requested. In the alternative, the CARP specification alternatively assumes that the client (i.e., web browser) has knowledge of the CARP array and is able to send directly into the array. However, this is difficult because CARP arrays exist in the Internet and Content Delivery Networks ("CDN"), which is well hidden from clients.

FIG. 1 is a block diagram of a communication system 10 that includes one embodiment of the present invention. Communication system 10 includes a network 30. In one embodiment, network 30 is the Internet.

A client computer 12 is accessed by a user to retrieve information from network 30. In one embodiment, client computer 12 is a general purpose personal computer having a processor, storage, and software for implementing an Internet browser such as the Internet Explorer from Microsoft Corp.

A network processor 14 is transparent to client computer 12 and receives URL requests from client computer 12. Network processor 14 includes a processor and storage (i.e., computer readable medium) for storing executable instructions. Network processor 14 executes a deterministic algorithm for determining where, in an array of cache servers, a URL is located. In one embodiment, the deterministic algorithm is the CARP algorithm, and the array of cache servers is a CARP array.

A cache array 16 is coupled to network processor 14 through network 30. Cache array 16 includes cache servers 20–22. Each cache server holds cached data corresponding to URLs. Cache array 16 can be any type of cache array that provides for redirection among cache servers. In one embodiment, cache array 16 is a CARP based cache array.

Figure 2:
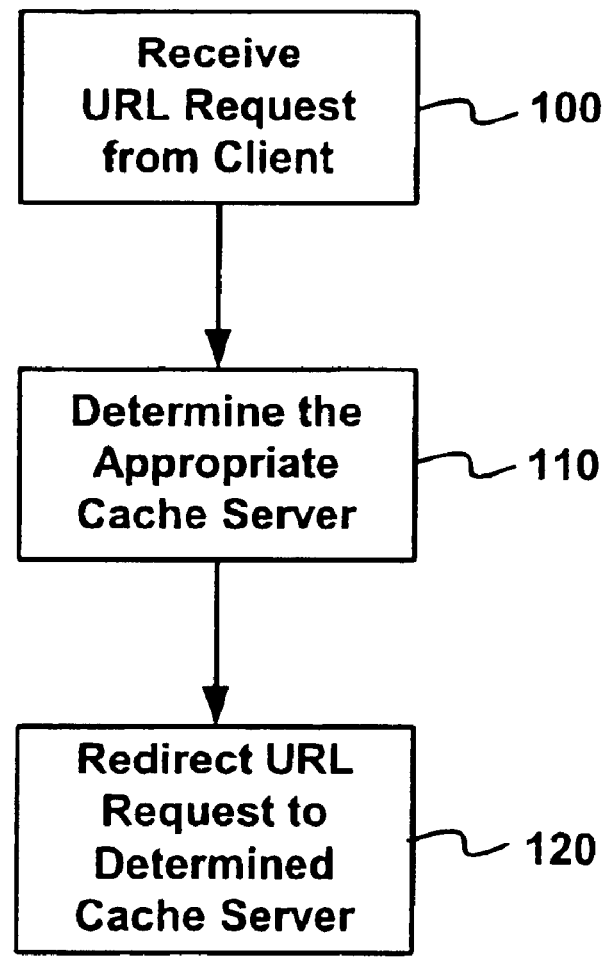
FIG. 2 is a flow chart illustrating steps performed by a network processor in accordance with one embodiment of the present invention.

FIG. 2 is a flow chart illustrating steps performed by network processor 14 in accordance with one embodiment of the present invention. In one embodiment, the steps are stored as software and executed by a processor. In other embodiments, the steps are performed by any combination of hardware or software.

At step 100, network processor 14 receives a URL request from client computer 12. In one embodiment, the URL request is a request for an Internet web page through an Internet browser on client computer 12.

At step 110, network processor 14 determines which cache in cache array 16 stores the requested URL. The determination is made by executing a deterministic algorithm. In one embodiment, the deterministic algorithm is the CARP algorithm.

At step 120, network processor 14 redirects the URL request to the cache that was determined to store the requested URL. Essentially, network processor 14 "injects" the URL request into the correct cache. The URL is then retrieved from the cache and ultimately sent to client computer 12 in a known manner.

As described, a transparent network processor routes a URL request to an appropriate cache in a cache array. As a result, intercache traffic is highly reduced.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of responding to a URL request comprising:
   receiving the URL request from a client computer;
   determining a cache in a cache array that stores a URL corresponding to the URL request; and
   redirecting the URL request to the determined cache;
   wherein said determining and redirecting is executed by a network processor that is transparent to said client computer.

2. The method of claim 1, wherein the cache array comprises a plurality of caches and provides for redirection among the plurality of caches.

3. The method of claim 1, wherein the cache array is a Cache Array Routing Protocol based array.

4. The method of claim 1, wherein the cache is determined by executing a deterministic algorithm.

5. The method of claim 4, wherein the deterministic algorithm is a Cache Array Routing Protocol algorithm.

6. The method of claim 1, wherein the URL request is received from an Internet web browser executed on said client computer.

7. The method of claim 1, wherein the network processor is separate from the cache array.

8. A computer readable medium having instructions stored thereon that when executed by a processor cause the processor, after receiving a URL request from a client computer, to:
   determine a cache in a cache array that stores a URL corresponding to the URL request; and
   redirect the URL request to the determined cache;
   wherein said determine and redirect operations are executed by a network processor that is transparent to said client computer.

9. The computer readable medium of claim 8, wherein the cache array comprises a plurality of caches and provides for redirection among the plurality of caches.

10. The computer readable medium of claim 8, wherein the cache array is a Cache Array Routing Protocol based array.

11. The computer readable medium of claim 8, wherein the cache is determined by executing a deterministic algorithm.

12. The computer readable medium of claim 11, wherein the deterministic algorithm is a Cache Array Routing Protocol algorithm.

13. The computer readable medium of claim 8, wherein the URL request is received from an Internet web browser executed on said client computer.

14. The computer readable medium of claim 8, wherein the network processor is separate from the cache array.

15. A communication network comprising:
   a network processor; and
   a cache array coupled to said network processor;
   wherein said network processor is programmed to receive a URL request from a client computer, determine a cache in the cache array that stores a URL corresponding to the URL request, and redirect the URL request to the determined cache and
   wherein said network processor is transparent to said client computer.

16. The communication network of claim 15, wherein said network processor is separate from said cache array.

17. The communication network of claim 15, wherein said cache array comprises a plurality of cache servers.

18. The communication network of claim 15, wherein said cache array is a Cache Array Routing Protocol based array.

* * * * *